United States Patent [19]

Schnaars

[11] Patent Number: 4,997,502

[45] Date of Patent: Mar. 5, 1991

[54] PROCESS AND APPARATUS FOR APPLYING AN ADHESIVE TO THE INTERIOR SURFACE OF A BULK BAG AND GLUING A PLASTIC LINER WITHIN THE BAG

[76] Inventor: Daniel R. Schnaars, 204 "A" Easy Street, Lafayette, La. 70506

[21] Appl. No.: 448,853

[22] Filed: Dec. 12, 1989

[51] Int. Cl.$^5$ .................. B29C 63/26; B29C 63/48
[52] U.S. Cl. .................... 156/156; 156/287; 156/294; 156/423
[58] Field of Search ............ 156/156, 287, 293, 294, 156/382, 423; 383/109, 113, 116, 117; 53/175; 118/306, 315, 317, DIG. 3; 427/236, 238, 421; 493/93, 95, 217

[56] References Cited

U.S. PATENT DOCUMENTS

| | | | |
|---|---|---|---|
| 2,124,853 | 7/1938 | Grupe | 118/DIG. 3 |
| 3,206,074 | 9/1965 | Hoffmann | 156/287 |
| 4,374,871 | 2/1983 | Steinbis | 118/317 |
| 4,658,989 | 4/1987 | Bonerb | 383/109 |
| 4,946,291 | 8/1990 | Schnaars | 383/113 |

FOREIGN PATENT DOCUMENTS

| | | | |
|---|---|---|---|
| 0158361 | 10/1985 | European Pat. Off. | 383/111 |
| 0671720 | 2/1939 | Fed. Rep. of Germany | 118/306 |
| 0729469 | 11/1942 | Fed. Rep. of Germany | 118/306 |
| 0044873 | 3/1980 | Japan | 156/156 |
| 1005969 | 9/1965 | United Kingdom | 156/287 |

Primary Examiner—Michael W. Ball
Assistant Examiner—Steven D. Maki
Attorney, Agent, or Firm—Pravel, Gambrell, Hewitt, Kimball & Krieger

[57] ABSTRACT

A process for adhering a polyethylene liner to the interior of a fabric bulk bag, which would include the steps of providing a source of pressurized air flow; attaching the upper pour spout of the fabric bag to the source of air flow; causing the bag to inflate when the bag becomes filled with air; providing a means for applying adhesive to the interior wall of at least a portion of the interior wall of the fabric bag after the fabric has been inflated; providing a valving means for routing a quantity of the pressurized air through a second air flow chamber; providing a plastic liner in the air flow chamber so that as the secondary air flow makes contact with the liner, the liner is forced into the interior of the fabric bag and inflated against the inner surface of the walls of the fabric bag; and adhering the plastic liner to the wall of the fabric bag when the liner makes contact with the adhesive that has been applied to the wall of the fabric bag.

10 Claims, 3 Drawing Sheets 4,997,502

PROCESS AND APPARATUS FOR APPLYING AN ADHESIVE TO THE INTERIOR SURFACE OF A BULK BAG AND GLUING A PLASTIC LINER WITHIN THE BAG

BACKGROUND OF THE INVENTION

1. Field of the Invention

The apparatus and process of the present invention relates to bulk material transport bags. More particularly, the present invention relates to a process for applying an adhesive in the interior of a bulk material transport bag, and subsequently gluing a plastic liner within the bag, and the apparatus for undertaking this process.

2. General Background

In the current state of the art in the construction of bulk material transport bags, herein referred to as bulk bags, these types of bags are utilized to transport dry or liquid bulk and may contain up to two tons of bulk when the bag is filled with material. Quite often it is required that the material bulk bag, which is constructed of an open weave fabric, includes a plastic or polyethylene liner within the bag, so that fine powdery bulk or liquid bulk, does not seep through the pores in the fabric in the exterior fabric bag, resulting in loss of product or contamination of the product.

Applicant has filed an application for letters patent for a bulk bag containing a glued in liner bearing U.S. Ser. No. 07/251,020, and filed Sept. 27, 1988 entitled "Semi-Bulk Bag With Liner And Method Of Assembly", which is U.S. Pat. No. 4,946,291, and is incorporated hereinto by reference. There is disclosed in that application the manner in which the polyethylene liner is positioned within a bulk bag after glue has been placed along the upper shoulders of the bag and around the lower exit spout of the bag. The bag is then shown to be manually inflated, so that the polyethylene liner likewise inflates against the sidewall of the bulk bag, and the adhesive causes the plastic liner to make permanent contact with the outer fabric bag. Therefore, when the bulk is removed from the bag, the plastic liner will not follow the bulk out of the plastic bag, and perhaps be lost in the bulk, or worse yet cause contamination of the bulk should the plastic have become contaminated on it's exterior surface when it contacted the fabric bag.

However, there is a need for a process and apparatus, for applying the adhesive to the interior of a bulk bag, inserting the plastic liner into the bag, and gluing the liner to the bag, all using a singular apparatus, and a singular process. Such a process and apparatus are disclosed by the present invention.

SUMMARY OF THE PRESENT INVENTION

The apparatus and process of the present invention solves problems in the art in a simple and straightforward manner. What is provided is a process for adhering a polyethylene liner to the interior of a fabric bulk bag, which would include the steps of providing a source of pressurized air flow; attaching an upper pour spout of the fabric bag to the source of air flow; inflating the bag by the flow of air into the bag; providing a means for applying adhesive to the interior wall of at least a portion of the interior wall of the fabric bag after the bag has been inflated; providing a valving means for routing a quantity of the pressurized air through a second air flow chamber; providing a plastic liner in the second air flow chamber so that as the air flow makes contact with the liner, the liner is forced into the interior of the fabric bag; and adhering the plastic liner to the wall of the fabric bag when the liner makes contact with the adhesive that has been applied to the wall of the fabric bag.

The apparatus for achieving the above process would include a first chamber having at least an anterior neck portion for attaching the upper spout of a fabric bag thereonto; a means for forcing pressurized air from the chamber into the interior of the bag and fully inflating the bag; a means for spraying an adhesive along a portion of the interior wall of the bag when the bag is in the inflated state; a plastic liner, such as polyethylene, positioned within a portion of the chamber for receiving pressurized air into the liner; a means for forcing the liner into the interior of the fabric bag and inflating the liner with pressurized air so that the liner makes contact with that portion of the sidewall of the bag that includes the adhesive and is adhered thereto.

It is therefore a principal object of the present invention to provide a process for adhesively attaching an interior polyethylene liner to a fabric bulk bag by inflating the bulk bag, applying glue to a portion of the interior wall of the bulk bag and inflating the liner so that the liner is adhesively attached to the bulk bag while it is in the inflated state;

It is a further object of the present invention to provide an apparatus for securing an polyethylene liner in a fabric bulk bag by use of pressurized air to expand the bulk bag, a means for applying glue to at least a portion of the inner surface of the bulk bag, and pressurized air to inflate the liner within the inflated bulk bag so that the liner makes adhesive contact with the bulk bag while it is in the inflated state.

It is still a further object of the present invention to provide a process for attaching a polyethylene liner inside of a fabric bulk bag without removing the bulk bag from the source of pressurized air after the air has inflated the bulk bag and the liner positioned therein.

It is still a further object of the present invention to provide a process for inflating a bag, applying glue within the inflated bag, inflating a liner within the bag, and gluing the liner to the wall of the bag, without the bag being removed from the source of pressurized air during the process.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
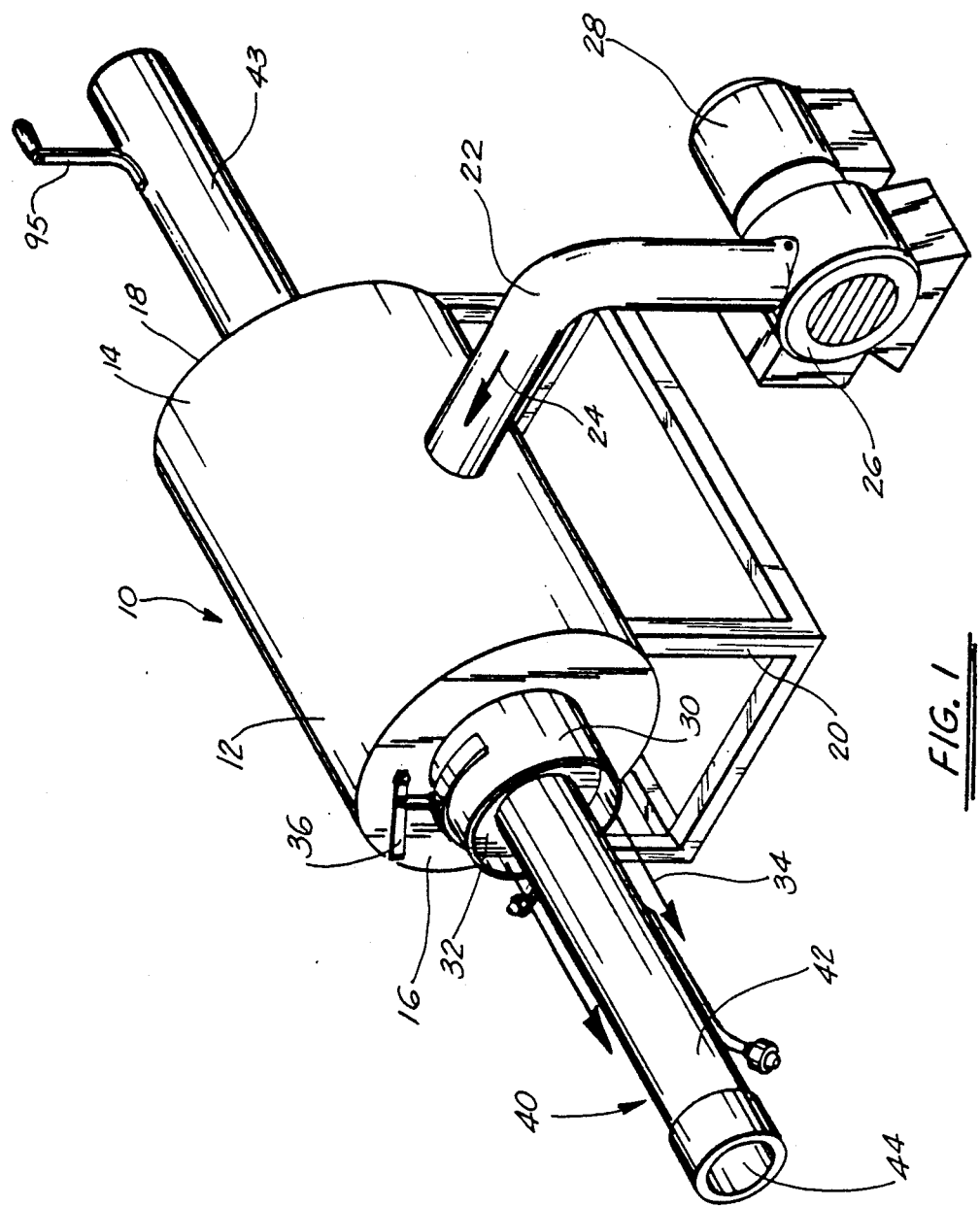
FIG. 1 illustrates an overall perspective view of the preferred embodiment of the apparatus of the present invention.

FIGS. 1-7 illustrate the preferred embodiment of the process of the present invention and the apparatus for undertaking the process. As illustrated, more particularly in FIG. 1, apparatus 10 would comprise a cylindrical housing 12 having a continuous sidewall 14, and a first front end wall 16 and a rear end wall 18, housing 12 defining an air receiving space therewithin as which will defined further. As further illustrated in FIG. 1, cylindrical housing 12 is supported onto a metal framework 20 so as to maintain housing 12 in substantially a horizontal position as illustrated. It is foreseen that in the preferred embodiment housing 12 could be positioned vertically, as the case may be. Furthermore, housing 10 has inserted into the sidewall an air flow line 22 for delivering a flow of pressurized air in the direction of arrow 24 via a fan 26 that is driven by electrical motor 28.

Housing 12 also includes a means for supporting a material bulk bag engaged onto the housing and for injecting air into the bulk bag for inflation thereinto. This means would first include a cylindrical collar member 30 secured to the first front wall 16 of housing 12 and defining an opening 32 therewithin, so that air may flow through opening 32 outward in the direction of arrows 34.

Figure 3:
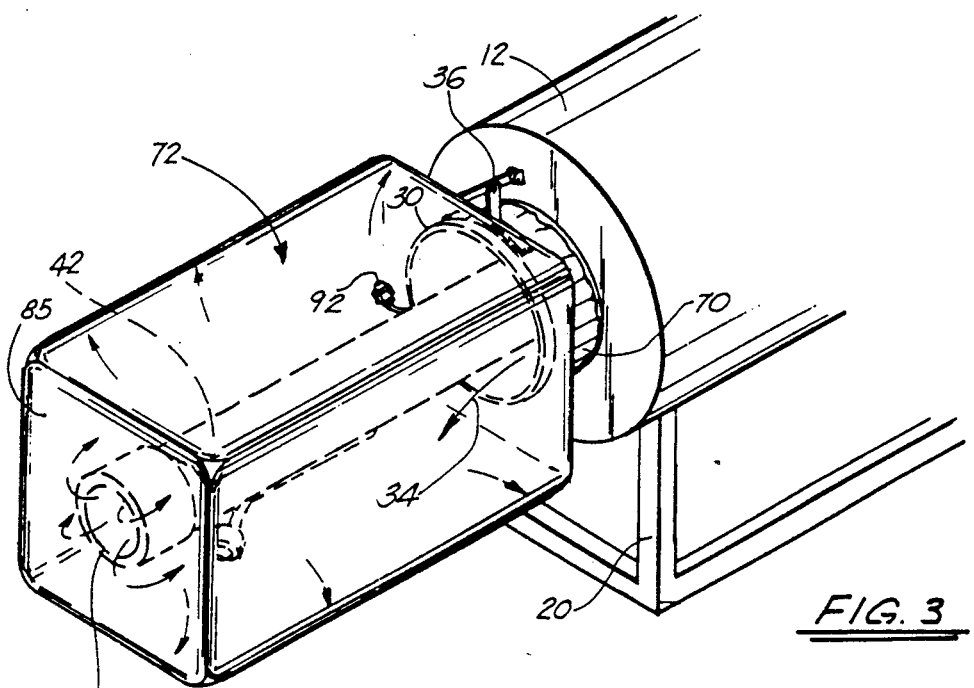
FIG. 3 illustrates a partial overall view of the apparatus of the present invention with the bulk material bag fully inflated and secured onto the apparatus.

Further, there is illustrated a clamp means 36 which is attached to the outer surface of collar 30, the clamp means 36 utilized to secure the upper flow spout of a material bulk bag in the position as seen in FIG. 3. Further, a delivery means 40 is provided which comprises an elongated delivery tube 42 having a continuous bore 44 therethrough, the tube member extending through the housing 12, with the forward part of delivery tube 42 extending out of opening 32 of the front wall 16 of the housing 12, and the rear part 43 of member 42 protruding a distance out of an opening in the rear wall 18 of the housing 12, and including a handle 45, the function of the tube 42 which will be discussed further.

Figure 2:
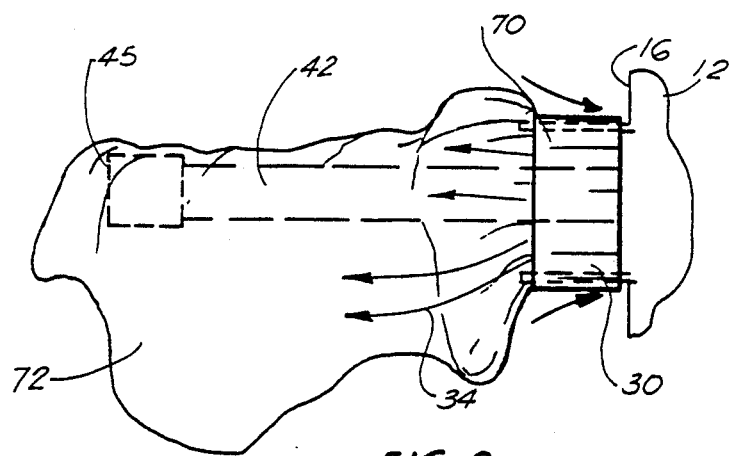
FIG. 2 illustrates a partial side view of the apparatus of the present invention and the process of inflating a material transport bulk bag secured thereupon.

Turning now to the process in which apparatus 10 is utilized, reference is made to FIG. 2, where there is illustrated the front end wall 16 of housing 12 wherein collar member 30 has received the neck portion 70 of the upper spout of a bulk bag 72, the type of bag which is a flexible fabric bag for receiving bulk material therein for shipment. As illustrated, bulk bag 72 has been positioned onto collar 30, and clamp means 36 has been clamped into position around the neck 70 of bulk bag 72. (FIG. 3) Delivery tube 42, as illustrated in phantom view in FIGURE 2, is protruding outward into the interior bulk space of bag 72. At this point, fan 26 would deliver the pressurized air into the chamber 12, with the air flowing from opening 32 in the direction of arrows 34, for inflating bulk bag 72. Bulk bag 72 is seen fully inflated in FIG. 3.

Figure 4:
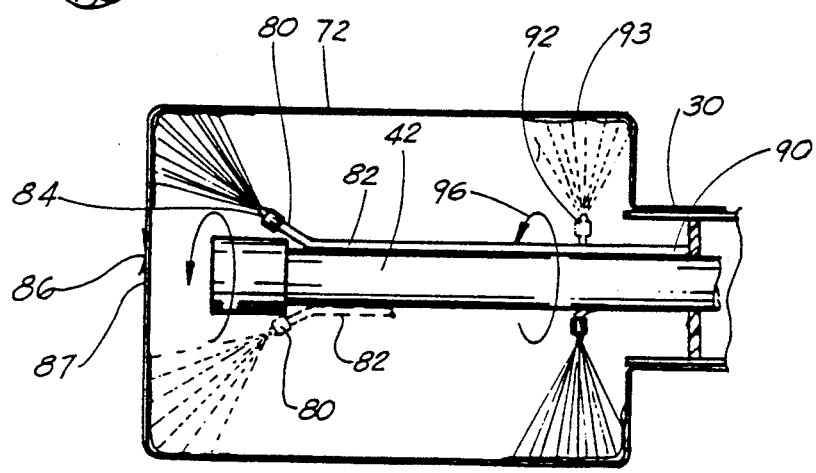
FIG. 4 illustrates a side cross-sectional view of a material bulk bag fully inflated on the apparatus while glue is being applied to the inner surface of the bag.

FIG. 4 illustrates a cross-section side view of bulk bag 72 secured around collar 30 of the apparatus, with a steady delivery of air delivered into the inner space of bulk bag 72 in order to maintain it in the inflated state. As is illustrated in FIGS. 1 and 4, tube 42 would further include means for delivering a quantity of glue in a spray pattern around strategic points on the interior surface in the bulk bag. As seen in FIG. 4, this means would include a first glue injection member 80, which comprises a glue delivery line 82, and a glue nozzle 84, with glue delivery line 82 secured along the outer wall of tube 42. As illustrated glue line 80 would terminate at a position angular from the wall of tube 42, with the nozzle 84 of glue member 80 positioned so that the glue sprayed from the end of nozzle 84 is applied to a circular portion of the bottom of bag 72, which would principally be that strip of material of the bottom 85 which surrounds the opening 86 of down spout 87 which is seen in the closed position in FIGURE 4, to form a lower glue layer 89.

Likewise, a second glue line 90 is secured to tube 42, having a second nozzle 92, with nozzle 92 positioned at an angle substantially at right angle from the alignment of tube 42 and in a position within bag 72, so that a layer of glue 89A is applied continuously in a strip along the interior surface of the upper shoulder of the bag, during the gluing process.

Returning now to FIG. 1-4, the rear portion 43 of delivery arm 42 includes a handle member 95, with handle member 95 providing a means for rotating delivery arm 42 during the application of the glue. Therefore, as seen in FIG. 4, when the arm is rotated in the direction of arrows 96, nozzle 84 applies a continuous layer of glue in a circle around the outer spout 87 of bag 72, and second nozzle 92 would deliver a continuous layer of glue around the upper shoulder portion 93 of bag 72. Therefore, after the tube 42 has been rotated a complete circle, each of the upper shoulder and lower wall of the bag 72 has had glue applied thereto.

Figure 5:
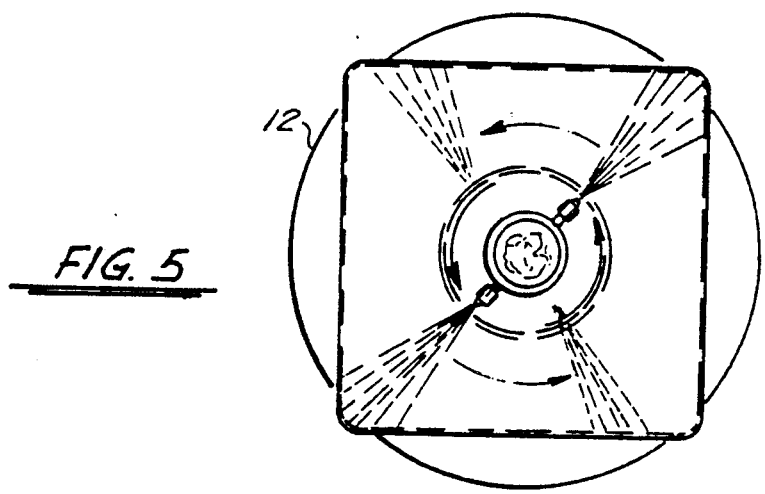
FIG. 5 illustrates a front view of the process being undertaken in FIG. 4.
Figure 6:
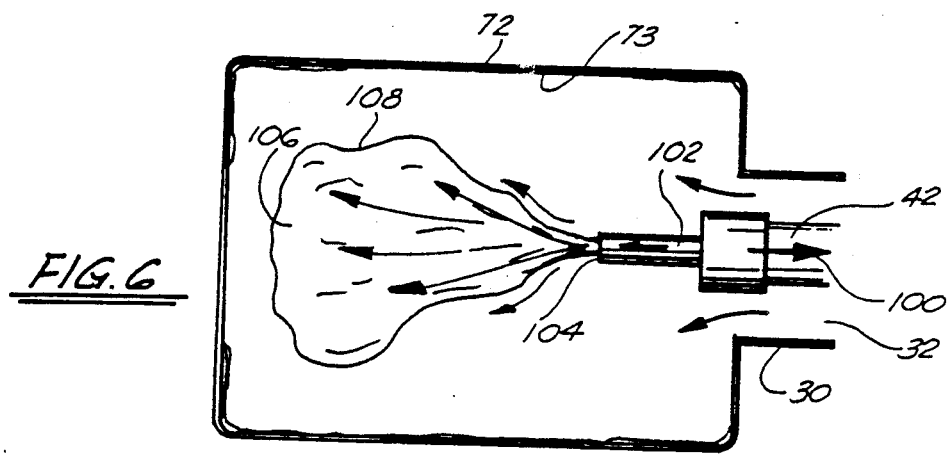
FIG. 6 illustrates a side view of the process of inflating the polyethylene liner within an inflated bulk material bag after the glue has been applied onto the inner surface of the bulk bag.
Figure 7:
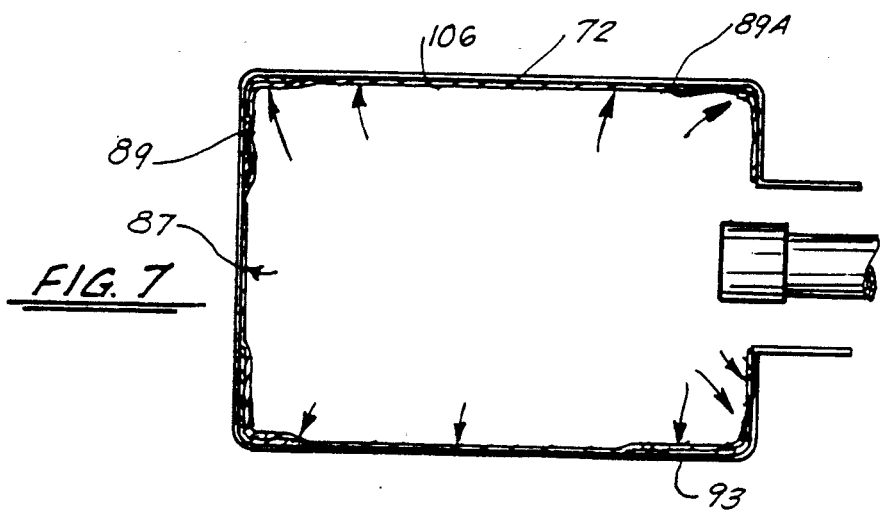
FIG. 7 illustrates the polyethylene liner adhering to the walls of the material transport bag when both bags are in the inflated state while in position on the apparatus.

Following the application of the glue in the circular pattern as illustrated in FIGS. 4 and 5, reference is made to FIG. 6 and 7, for the next step in the process. As illustrated in FIG. 6, delivery arm 42, following the application of the glue within the confines of bag 72 as illustrated in FIG. 4, is retreated in the direction of arrow 100, and an inner delivery line member 102, which includes a bore 104, remains protruding out into the confines of bag 72. It must be kept in mind that during this entire process, bag 72 is maintained in the inflated state via the delivery of air into the bag through flow bore 32 within collar 30. After following the retreat of line 42 into the confines of housing 12, there is provided a valving means within housing 12, wherein the air that was delivered via line 24 into the housing 12 and through bore 32, is then directed to flow only through line 102 to be delivered into line 102, through bore 104, as illustrated in FIG. 6. Bore 104 would house a plastic liner 106, preferably of polyethylene material that has been positioned within bore 104 in the deflated state and housed within bore 104. However, upon the introduction of air into the internal bore 104 of line 102, polyethylene liner 106 is then forced out of the housing 104, and the air flowing through bore 104 inflates liner 106, in the position as seen in FIG. 7. In that position, the entire outer surface 108 of polyethylene liner 106 has made contact and is adhering to the inner surface 73 of bag 72. At that point where glue was applied via nozzles, i.e., the circular pattern 89 around downspout 87, and the circular pattern 89A around the upper shoulder portion 93 of bag 72, the polyethylene liner 106 would be adhered at the specific points and therefore polyethylene liner 106 would be adhesively secured within bag 72 along the continuous glue layer 89A along shoulder portion 93 and along the glue layer 89 along the fabric surrounding downspout 87.

It should be noted, that the gluing of the interior liner 106 at these two points is critical to the operation and success of the bag. It has been found that as bulk material flows from bag 72, the flowing of the material would tend to want to pull liner 106 out of the bag and with the liner 106 following the flow of the material through the downspout. However, with liner 106 being glued around upper vertical shoulder portion of the bag, it can better resist the downward forces of the flow of material and therefore is secured within the bag more efficiently. Likewise, the positioning of the circular pattern of glue 89 around the downspout of the bag, adhesively secures the interior liner 106 at the point that the flow of material that is exiting the bag, and likewise serves to more effectively secure liner 106 within bag 72.

Of course, following the inflation of the bag as seen in FIG. 7, the air is then turned off, and the bag and the liner are removed from the apparatus, and can be folded for storage and for use with bulk material.

It should be noted that although this is the preferred embodiment of the process, it is seen that it may be possible that the process simply include the positioning on the collar as illustrated in FIG. 2, inflating the bulk bag 72 via air as illustrated in FIG. 3, subsequently applying the adhesive glue material around the two critical portions of the bag as illustrated in FIG. 4. After these steps have been accomplished by apparatus 10, the bag may be removed, and the liner manually placed within the bag with the bag reinflated with the liner, and the liner inflating to follow the contours of the bag as illustrated in FIGURE 7, with the liner 106 making adhesive contact at the critical points as illustrated. However, it would be a more efficient process if liner 106 were included within the confines of tube 102, and would simply be driven out of tube 102 via air pressure as illustrated in FIG. 6, rather than be manually inserted and inflated in the bulk bag 72 in the process.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for inflating a bulk material transport bag and adhering a plastic liner in the bag, the apparatus comprising:
   a) a primary air-receiving chamber including an opening in a wall of the chamber;
   b) means for introducing a flow of air into the chamber so that the flow of air flows out of the opening in the wall of the chamber;
   c) means for securing an opening of the bag to the opening in the chamber so that the air flowing out of the chamber inflates the bag;
   d) means for applying an adhesive to at least a portion of the interior wall of the bag while the bag is inflated; and
   e) means for introducing the plastic liner into the bag and inflating the liner so that the liner adheres to the interior wall of the bag at least on those portions where the adhesive has been applied.

2. The apparatus in claim 1, wherein the means for flowing air into the chamber comprises a blower including a flow line connecting the blower with the interior of the chamber.

3. The apparatus in claim 1, wherein the means for securing the bag onto the opening in the chamber further comprises an annular collar, including a clamp member for clamping the bag onto the collar.

4. The apparatus in claim 1, wherein the means for applying an adhesive to a portion of the interior of the bag further comprises an arm member, including a pair of glue spraying nozzles, the arm member extendible outward into the inflated bag, so that upon rotation of the arm member, glue is sprayed from the nozzles onto the shoulder portions and the end wall of the bag.

5. The apparatus in claim 1, wherein the means for inflating a polyethylene liner into the bag further comprises a tube positioned within a bore of the arm member, the tube housing a deflated polyethylene liner, so that upon air being introduced into the hollow of the tube, the polyethylene liner is forced from the tube into the inflated bag and inflated therein.

6. A process for inflating a bulk material transport bag and gluing a plastic liner therein, the process comprising the following steps:
   a) providing a primary air-receiving chamber, having an opening in at least a face of the chamber;
   b) securing an opening of the bag around the opening in the chamber;
   c) inflating the bag with air that has been introduced into the chamber;
   d) extending a means into the bag for applying glue along at least an interior wall portion of the bag;
   e) applying glue to the interior or the bag;
   f) providing a plastic liner in the material bulk transport bag; and
   g) inflating the plastic liner, so that the wall of the liner adheres to the wall of the bag where glue has been applied.

7. The process in claim 6, wherein the means for applying glue further comprises an arm member having a pair of glue nozzles attached thereto, and extendible into the inflated bag, so that glue is applied to the wall of the bag as it is sprayed from the nozzles.

8. The process in claim 6, wherein the glue is applied to the interior of the bag by rotation of the arm member in a circular motion so that one nozzle applies glue to the upper shoulder portion of the bag and a second nozzle applies glue to the surface of the end wall of the bag surrounding a down spout opening of the bag.

9. A process for inflating a bulk material transport bag and gluing a plastic liner therein, the process comprising the following steps:
   a) providing a primary air receiving chamber and introducing air thereinto;
   b) attaching the bulk material transport bag to an opening in the chamber, so that air flowing into the chamber flows into the bag and inflates the bag;
   c) introducing a means into the inflated bag for spraying glue along the upper shoulder portion of the bag and around the down spout opening of the bag;
   d) spraying glue along the interior surface of the bulk material transport bag;
   e) providing means for introducing a plastic liner into the bag and inflating the plastic liner with the air from the air receiving chamber; and
   f) securing the inflated plastic liner against the interior wall of the inflated bulk material transport bag at those points where glue has been sprayed along the interior surface of the bulk material transport bag.

10. The process in claims 6 or 9, wherein the plastic liner comprises a polyethylene material.

* * * * *